US011785354B2

(12) United States Patent
Diasparra et al.

(10) Patent No.: US 11,785,354 B2
(45) Date of Patent: Oct. 10, 2023

(54) IMAGE SENSOR FOR OPTICAL CODE RECOGNITION

(71) Applicant: TELEDYNE E2V SEMICONDUCTORS SAS, Saint Egreve (FR)

(72) Inventors: Bruno Diasparra, Seyssins (FR); Thierry Ligozat, Quaix en Chartreuse (FR); Romain Guiguet, Grenoble (FR); Gareth Powell, Saint-Martin-d'Uriage (FR); Jérôme Vanrumbeke, Saint-Étienne-de-Saint-Geoirs (FR); Arnaud Foucher, Meylan (FR)

(73) Assignee: TELEDYNE E2V SEMICONDUCTORS SAS, Saint Egreve (FR)

( * ) Notice: Subject to any disclaimer, the term of this patent is extended or adjusted under 35 U.S.C. 154(b) by 323 days.

(21) Appl. No.: 17/290,845

(22) PCT Filed: Oct. 28, 2019

(86) PCT No.: PCT/EP2019/079357
§ 371 (c)(1),
(2) Date: May 3, 2021

(87) PCT Pub. No.: WO2020/094441
PCT Pub. Date: May 14, 2020

(65) Prior Publication Data
US 2021/0392285 A1 Dec. 16, 2021

(30) Foreign Application Priority Data
Nov. 6, 2018 (FR) ........................................ 1860214

(51) Int. Cl.
*H04N 25/46* (2023.01)
*H04N 25/76* (2023.01)
(Continued)

(52) U.S. Cl.
CPC ............... *H04N 25/46* (2023.01); *G06T 7/42* (2017.01); *G06V 10/147* (2022.01); *G06V 10/19* (2022.01);
(Continued)

(58) Field of Classification Search
CPC .......... H04N 25/46; G06T 7/42; G06V 10/19; G06V 10/22; G06V 10/23; G06V 10/26;
(Continued)

(56) References Cited

U.S. PATENT DOCUMENTS

| 6,276,605 B1 | 8/2001 | Olmstead et al. |
| 2005/0103846 A1 | 5/2005 | Zhu et al. |
| 2021/0248218 A1* | 8/2021 | Lee ...................... H04N 25/705 |

FOREIGN PATENT DOCUMENTS

| CA | 2734613 A1 * | 2/2010 | ......... G05D 23/1905 |
| JP | 2004-282532 A | 10/2004 | |

(Continued)

OTHER PUBLICATIONS

EPO, English-Language translation of Written Opinion for PCT/EP2019/079357 (dated Dec. 12, 2019) (Year: 2019).*

(Continued)

*Primary Examiner* — David N Werner
(74) *Attorney, Agent, or Firm* — K&L Gates LLP

(57) ABSTRACT

A CMOS image sensor for a code reader in an optical code recognition system incorporates a digital processing circuit that applies a calculation process to the capture image data as said data acquired by the sequential readout circuit of the sensor, in order to calculate a macro-image from the capture image data, which corresponds to location information of code(s) in the capture image, and transmit this macro-image in the image frame following the capture image data, in the footer of the frame.

20 Claims, 6 Drawing Sheets

Figure 1:
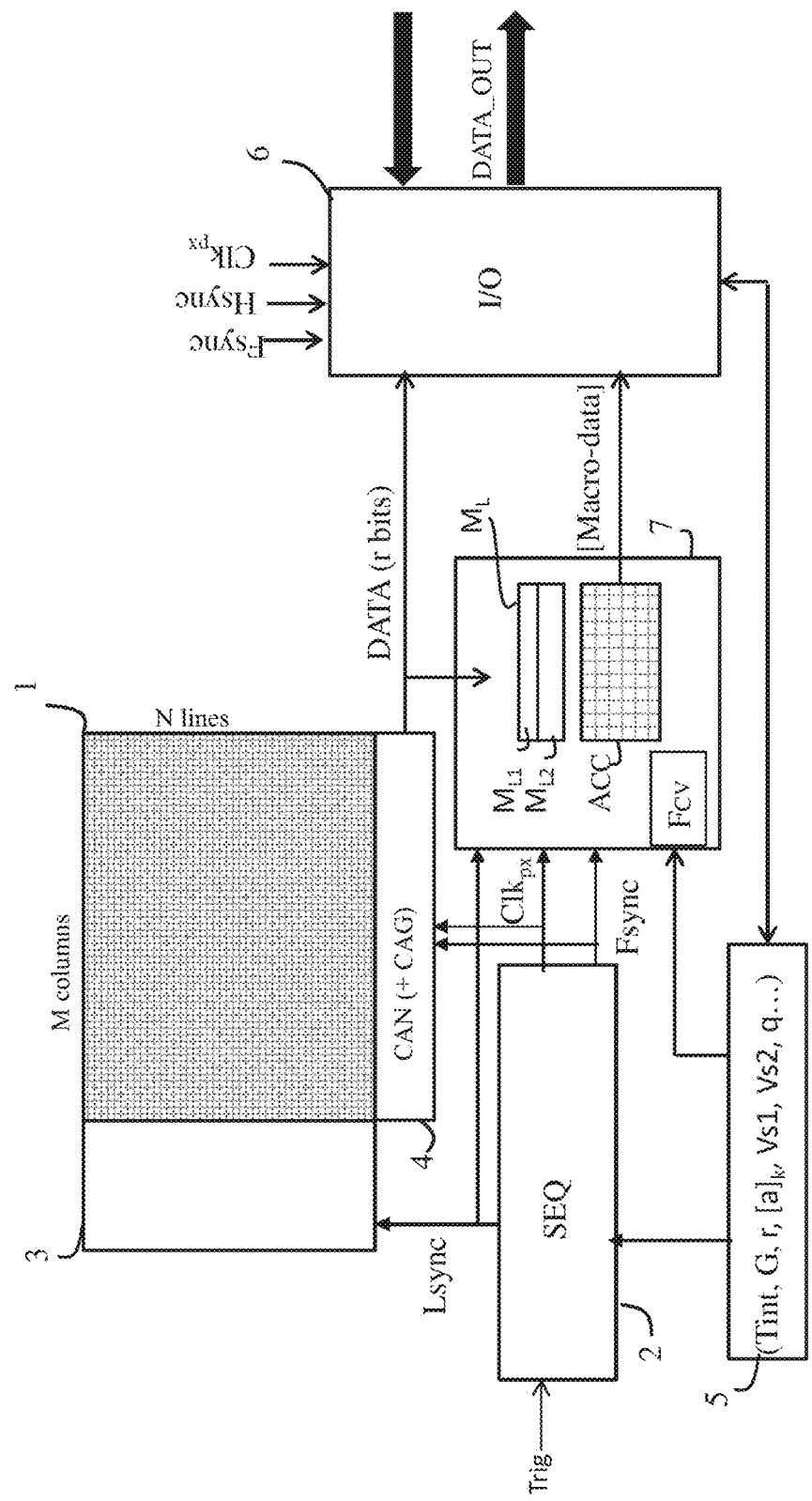

(51) Int. Cl.
| | |
|---|---|
| H04N 23/61 | (2023.01) |
| G06V 10/147 | (2022.01) |
| G06V 10/36 | (2022.01) |
| G06T 7/42 | (2017.01) |
| G06V 10/10 | (2022.01) |
| G06V 10/22 | (2022.01) |
| G06V 10/28 | (2022.01) |
| G06V 10/26 | (2022.01) |
| G06V 10/44 | (2022.01) |
| G06V 10/46 | (2022.01) |
| G06V 10/54 | (2022.01) |
| G06V 10/42 | (2022.01) |
| G06K 7/14 | (2006.01) |
| H04N 23/80 | (2023.01) |
| H04N 25/40 | (2023.01) |

(52) U.S. Cl.
CPC ............ *G06V 10/22* (2022.01); *G06V 10/23* (2022.01); *G06V 10/26* (2022.01); *G06V 10/267* (2022.01); *G06V 10/28* (2022.01); *G06V 10/36* (2022.01); *G06V 10/431* (2022.01); *G06V 10/44* (2022.01); *G06V 10/443* (2022.01); *G06V 10/467* (2022.01); *G06V 10/478* (2022.01); *G06V 10/54* (2022.01); *H04N 23/61* (2023.01); *H04N 25/76* (2023.01); *G06K 7/1413* (2013.01); *G06K 7/1478* (2013.01); *H04N 23/80* (2023.01); *H04N 25/40* (2023.01)

(58) Field of Classification Search
CPC ...... G06V 10/267; G06V 10/28; G06V 10/36; G06V 10/431; G06V 10/44; G06V 10/443; G06V 10/367; G06V 10/478; G06V 10/54

See application file for complete search history.

(56) References Cited

FOREIGN PATENT DOCUMENTS

| JP | 2007-228587 A | 9/2007 | |
| WO | 97/08647 A1 | 3/1997 | |
| WO | WO-2006101437 A1 * | 9/2006 | ........... G06F 3/0321 |
| WO | 2009-28652 A1 | 3/2009 | |

OTHER PUBLICATIONS

International Search Report and Written Opinion of the International Searching Authority for PCT/EP2019/079357 dated Dec. 12, 2019.

Katona et al., "A Novel Method for Accurate and Efficient Barcode Detection with Morphological Operations", 2012 Eighth International Conference on Signal Image Technology and Internet Based Systems (SITIS), IEEE, Nov. 25, 2012, pp. 307-314.

* cited by examiner

IMAGE SENSOR FOR OPTICAL CODE RECOGNITION

CROSS REFERENCE AND STATEMENT OF PRIORITY

This application is a U.S. National Stage Entry under 35 U.S.C. § 371 of International Patent Application No. PCT/EP2019/079357, entitled IMAGE SENSOR FOR OPTICAL CODE RECOGNITION, filed Oct. 28, 2019, which further claims priority to French Patent Application Number 1860214, filed Nov. 6, 2018, the contents of all of which are incorporated herein by reference in their entireties and for all purposes.

TECHNICAL FIELD

The present invention concerns matrix image sensors of the CMOS type containing active pixels (photosensitive element pixel structure and control transistors) used in optical code recognition devices. There are barcodes, which are symbolic, linear codes (1D barcode) or matrix codes (QR code, Data Matrix, Aztec, . . . etc.). Said codes are, for example, printed (labels, tickets, posters) or engraved on industrial or retail products, medical or laboratory products, or books, or they are displayed as an image on a smartphone, for instance (electronic code). They are used for a range of applications, such as traceability (manufacture, distribution, healthcare), sales, stock management, ticketing (transports, museums) and, more generally, access to payment services, or otherwise providing a link to additional content (web pages). The code to be recognised may also be (an) alphanumeric string(s), printed or embossed on a hard copy document or a plaque (license plate), and the applications concerned are, in particular, secure access management and/or paid access to services, such as, for example, the recognition of license plates when passing road tolls, or access to car parks.

PRIOR ART

An optical code recognition system ensures two functions: the capturing of the image and the recognition or reading of code(s), by digital image processing, which enables said optical code recognition system to associate the code recognised for a product, informational content, a service, . . . etc.

The image is captured by an image sensor that is integrated into a reader (code reader), which also integrates the lighting system (a light source, such as that from LEDS and/or a laser beam, associated with an optical assembly (mirrors, lenses) and an electronic control system which, upon being activated externally (by a mechanical means, such as a button or trigger, or electronic means, such as a presence detection system), controls the lighting of the target object and triggers the taking of the image by the sensor. A laser pointer may also be provided for (with a central focus). Each image is transmitted to an external digital processing system, which analyses the image in order to detect (locate) and recognise (decode) the code or codes contained in the image by way of adapted digital processing software, and triggers the associated applicative functions. This system must be capable of recognising the code or codes rapidly, and, for that purpose, uses hardware image analysis resources (memories, DSP micro-processors), in order to implement various different complex processing algorithms, as well as for location, code type research (geometric criteria), reorientation in a deciphering direction, decryption.

Several images may be necessary for that, depending upon the image quality, in particular in regard to the contrast: the system then activates the reader, changing the image capture parameters, such as the exposure time, lighting and gain, in the process. With a CMOS image sensor, including active pixels, the processing system can also specify one or more of the areas of interest, making it possible to limit the acquisition of image data in these particular regions.

An essential feature of optical code recognition systems is their processing speed. Said processing speed is dependent upon the image quality, which may vary depending upon the context in which the image is taken (lighting, exposure time), the target object itself (supporting properties: planarity, reflective qualities, stripes, etc.), and the relative position of the object facing the sensor camera. The image contrast can be improved through digital processing (enhancement) or by requesting a new image capture using more or less lighting. It is also possible to adjust the exposure time, to obtain a better image histogram (grey scale density curve in the image), and/or the conversion gain.

The processing speed, however, also depends upon the quantity of digital data to be processed, i.e. the size of the capture image.

However, a current trend is to use high resolution CMOS image sensors, which, in particular, makes it possible to relax the capture distance constraints (the distance between the capture plane and the target object) and with high encoding dynamics, e.g. 8, 10 or 12 bits. Image sensors which provide output images of a few megabits of data are therefore used.

One problem with this is that it impacts directly upon the digital processing systems, in regard to both the dimensioning (and the consumption) of material resources (computing power and memory capacity) and the processing time.

SUMMARY OF THE INVENTION

One object of the invention is to improve the performance of the optical code recognition systems, in particular in order to reduce their consumption (computing power, memory) and improve their response time. One method of improving that is to permit said systems to concentrate on the useful information contained in the capture image that is transmitted. Said useful information (the code or codes) corresponds to a small fraction of the capture image, in other words, to one or more areas of interest in the image. The computing power can then he focused on these areas.

The following technical problem has thus been resolved: to integrate into the image sensor functions for providing output, and, in addition, capture image data, supplementary data which would be code location information, with an adequate confidence index (accurate data); and to do so at the lowest cost to the sensor, i.e. without impacting upon the image delivery timeframe and without impacting upon the size of the sensor (compactness—integration into the sensor chip).

A common feature of the codes is that their image contains a lot of high-frequency spatial information (black/white contrasts), one or more directions, in accordance with the codes and their orientation in the image, as opposed to the image area around a code. It is this feature which is, moreover, exploited in the contour detection algorithms used for the recognition.

It is proposed, in the invention, to extract high frequency information, or, more generally, information representing a spatial code feature, in the image sensor itself, by calculating at least once convolution result at each image capture point, the magnitude of this result (its absolute value) and a binary threshold, so as to be able to separate the information sought from the noise in the image, in order to obtain information in regard to which the value 0 or 1 is code location information: the value of 1 means that the pixel is potentially in a code area.

In one example, the convolution calculation is a calculation of gradient, and what interests us is the magnitude of said gradient (i.e. its absolute value), as being indicative of location information.

This concerns extracting this information within the actual sensor, at the lowest cost. In particular, the latter must not affect the speed of acquisition or the transmission of capture image data. In other words, the extraction needs to be done in the time during which the capture image is acquired, and the data carrying the location information must be integrated into the transmission frame of the capture image, towards the external code recognition system. This should not require significant material resources, either, such as image memories or complex dedicated processors. It must be possible to integrate the material resources needed in order to implement this extraction function within the integrated circuit chip within the CMOS image sensor, advantageously in a manner that is programmable or configurable, making for easy adaptation (flexibility) with different codes and optical recognition applications. Finally, the information extracted and transmitted must be extremely reliable, in order to allow it to be used directly 1w the external recognition system, so as to be able to optimise its computing power and improve its processing speed.

The solution to these various technical constraints is achieved in the invention by a CMOS image sensor incorporating a digital processing block which, for each capture image taken, is synchronised on the line selecting signal (reading) in the pixel matrix, and configured to calculate a macro-image, within the time that the information is acquired by the pixels (exposure time of the pixels, and sequential reading line by line), in order to provide it in the footer of the capture image frame, following the capture image data. Each point of the macro-image corresponds to a block of dots of the image captured, and the value of each point of the macro-image concerns information that is indicative of the code location in the corresponding block of dots in the image captured.

The invention thus concerns a CMOS image sensor configured to implement the taking of an image, upon being controlled externally, and to transmit output, towards an optical code recognition system, the capture image data in a corresponding image frame, the image sensor being integrated into the same integrated circuit chip, a matrix of pixels comprising N lines and M columns, and a sequential reading circuit of the N lines of pixels of the matrix. According to the invention, the sensor is, moreover, integrated into a digital processing circuit configured to apply a calculation process to the capture image data according to the acquisition of them by the sequential reading circuit, and in a synchronous manner, in order to calculate a binary macro-image, taking as a starting point the capture image data corresponding to the code location information in said capture image, and to transmit it to the footer of said image frame, following said capture image data, said macro image being such that each macro-image point corresponds to a block of points of the capture image, and said calculation process of the macro-image comprising at least for each pixel of the matrix:
a first stage of calculation of at least one filter defined by the coefficients of a convolution mask, which establishes, for the pixel, a first numeric value, corresponding to high-frequency spatial information extracted from the capture image data of said pixel and the adjacent pixels in an adjacent window delimited by the convolution mask centered on the pixel, the calculation being carried out on the fly by the sequential reading circuit (4) of said capture image data of said pixel and the adjacent pixels, said first numeric value being encoded using the same number of bits (r) as said capture image data;
a second stage of binarisation of the first numeric value, establishing a first binary value for each pixel of the matrix; and for each block of pixels of the matrix:
a third stage of calculation of a second numeric value by summing up the said first binary values of the pixels of the block concerned in an accumulation register of $Q=b1+b2$ output bits. where b1 and b2 define the number $n=2^{b1}$ of lines of pixels of the block and the number $m=2^{b2}$ of columns of pixels of the block, n and in being integers which are greater than 1.

According to one aspect of the invention, the second numeric value is a value encoded using q bits where q=1 at Q.

In one variant, the calculation process includes a fourth stage, of binarisation of said second numeric value.

In one embodiment, processing of the morphological erosion type, followed by processing of the expansion type is applied to the binary values obtained following the fourth stage, with the aim of improving the confidence index on code location information.

The first stage of calculation preferably corresponds to a high frequency filter calculation that is non-directional, in other words, the indication of the result is not considered, and a calculation of one or more filters can be used in parallel, in particular at least one vertical gradient and one horizontal gradient, in order to obtain, by way of addition, a greater informational value.

According to another aspect of the invention, the filter calculation of the first stage applies to at least one filter from the following list: a non-directional high-frequency filter calculation combining one or more gradient calculations, a gradient calculation in a fixed direction, a filter corresponding to the spatial characteristics representing a type of code.

The sensor may, advantageously, be configured to apply a first data filter calculation to the data of a first capture image of a target object, and another filter calculation, different from the first, to data of a second image captured from the same target object. A confidence index can thus be used to supplement the location data of the macro-images. In one variant, the second capture image corresponds to zooming in on an area of interest determined taking the macro-image calculated using the data of the first capture image as a starting point.

The invention makes for providing a highly flexible solution, through facilities for programming the calculation and compression parameters, depending upon the conditions under which the capture image is taken (lighting, capture distance), and/or code type(s) and size(s). In particular, the number, dimensions and coefficients of the filters may be programmed depending upon the application. The binarisation threshold values may also be defined depending on the application or adapted to the actual conditions under which the image is taken (lighting, distance), depending upon other features calculated on the capture images, such as the histograms.

Figure 2:
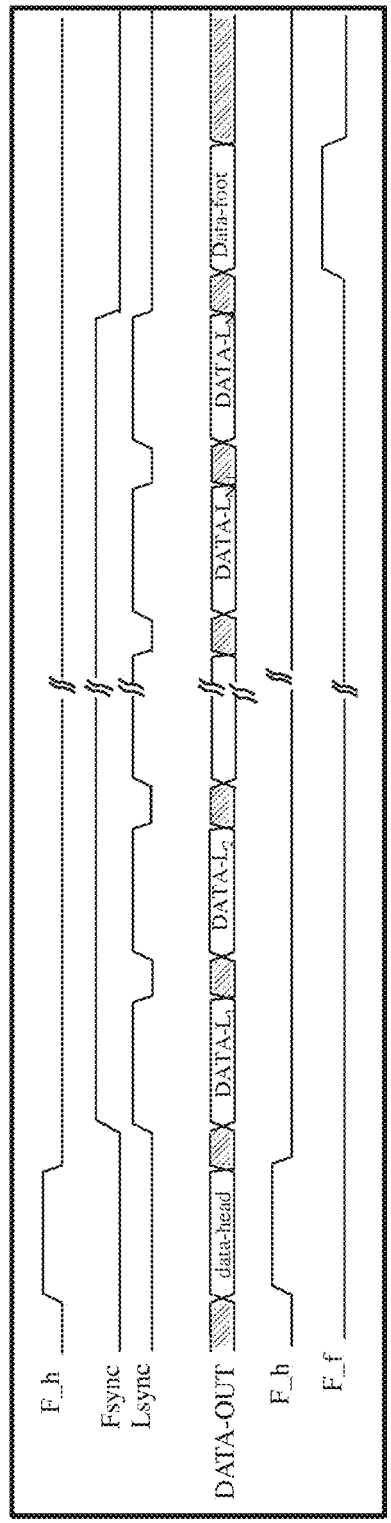
Figure 3:
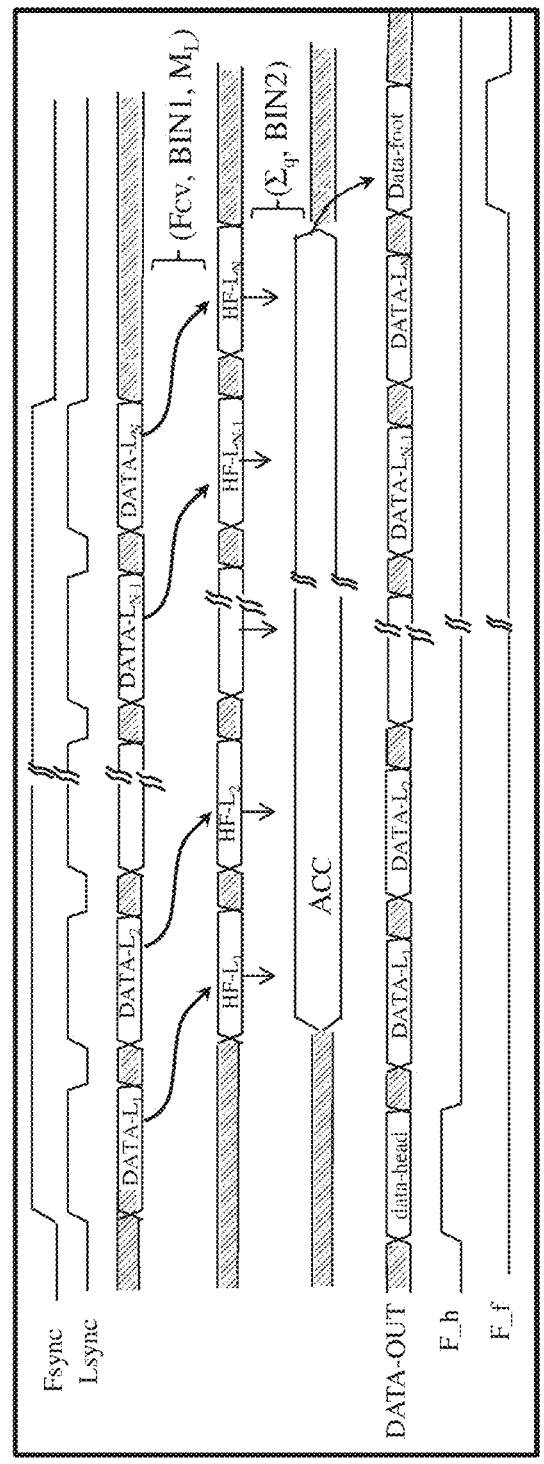
Figure 4:
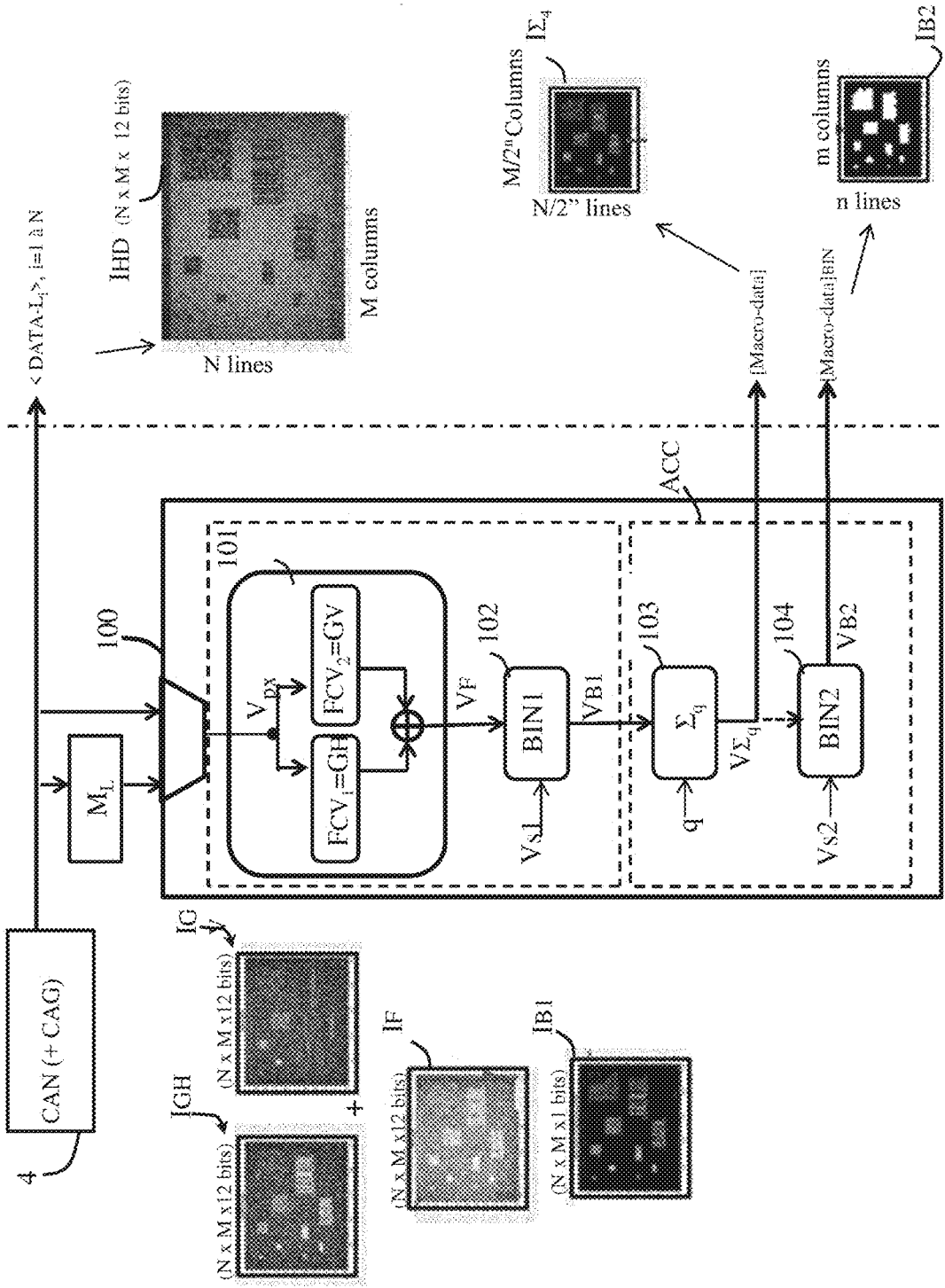
Figure 5:
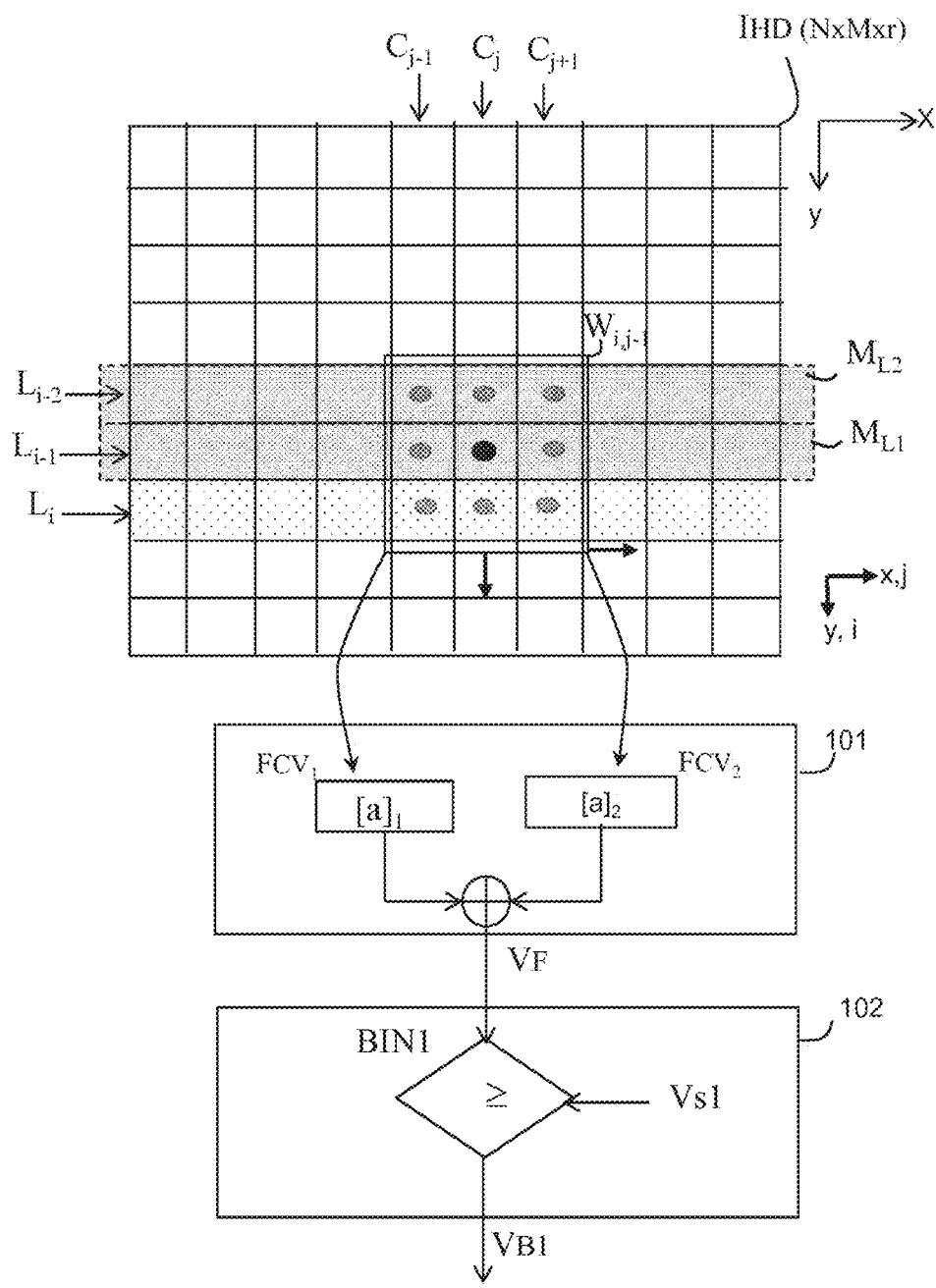
Figure 6:
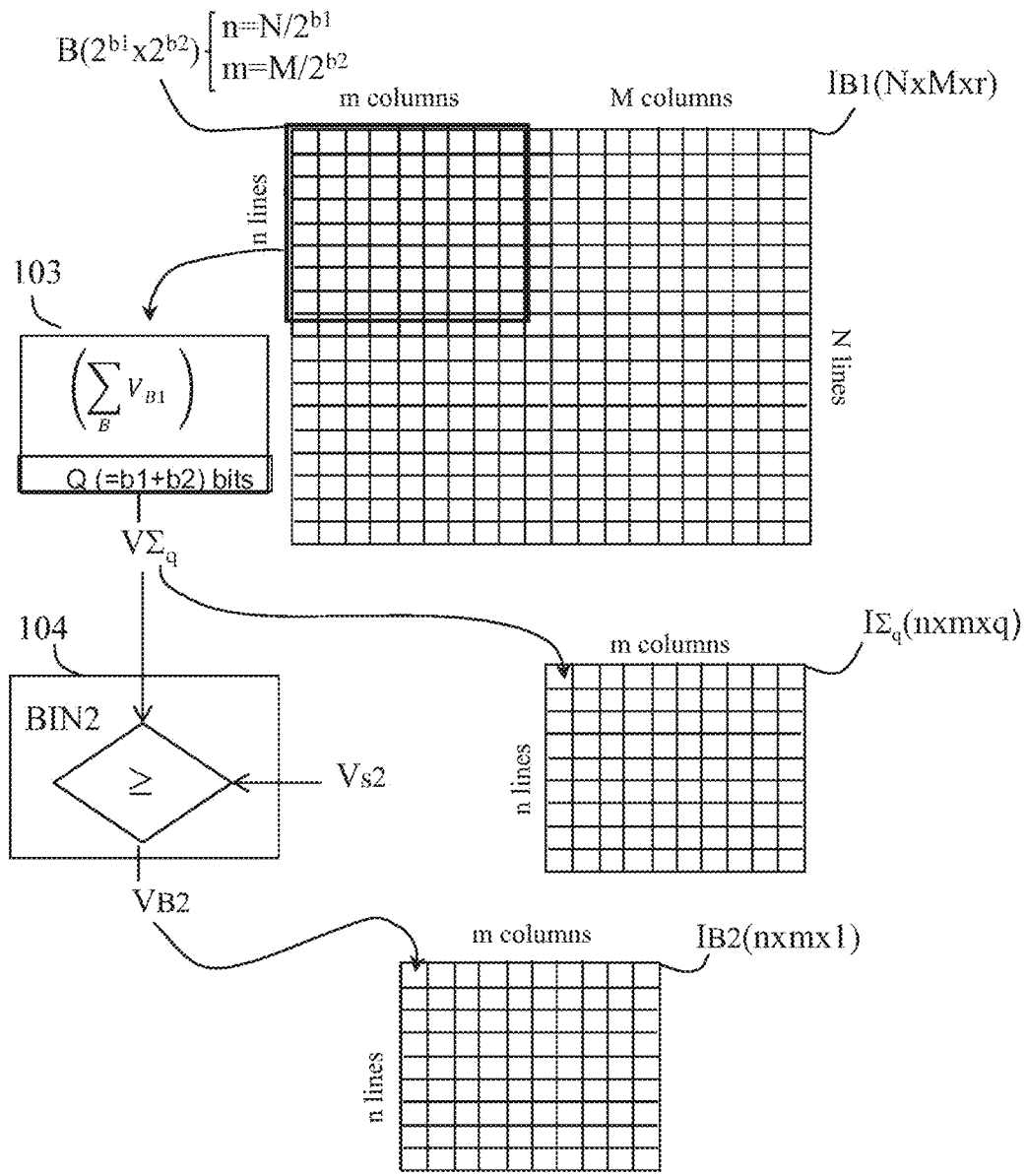
Figure 7:
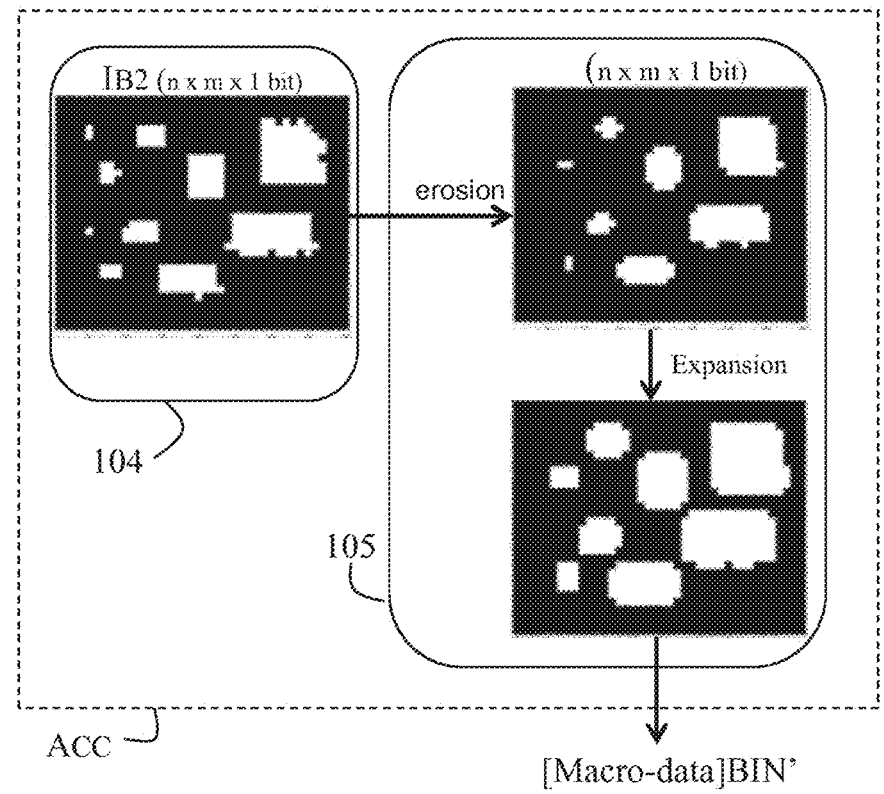
Figure 8:
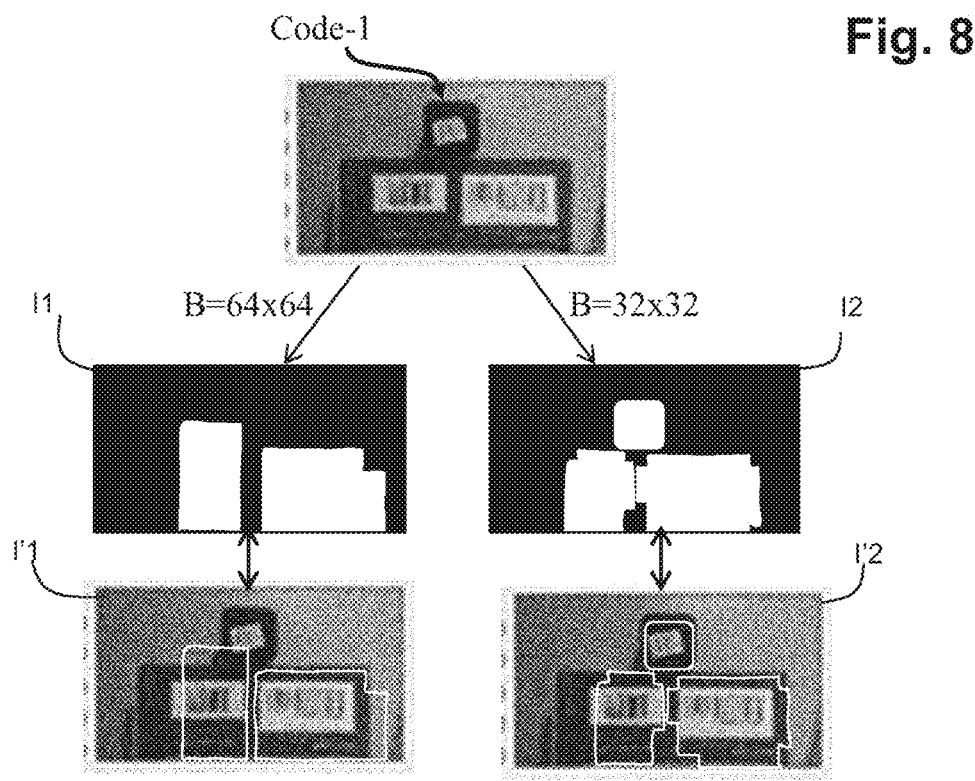

Other features, details and benefits of the invention may emerge from reading the description below, with reference being made to the attached drawings, by way of example, and which respectively represent:

FIG. 1, a functional block diagram of a CMOS image sensor in accordance with the invention;

FIG. 2, a chronogram of the clock signals and of data from a capture image frame in accordance with the prior art;

FIG. 3, a chronogram of the clock signals and of data from a capture image frame, including the extraction and transmission in said supplementary data frame, in the footer of the frame, in accordance with the invention;

FIG. 4, an organigram detailing the various different stages of extraction by calculating the supplementary data, according to the acquisition of the capture image data, and showing a simulation of the images corresponding to the data extracted and calculated at the different stages;

FIG. 5, an explanatory diagram of the first stage of calculation in each of the capture image points;

FIG. 6, an explanatory diagram of the second stage of calculation, for forming a macro-image in accordance with the invention;

FIG. 7, a diagram illustrating a supplementary stage, using morphological operators, in order to supplement the index of confidence in the data of a binary macro-image; and FIG. 8, a diagram highlighting the relationship between the block size of pixels used to form a macro-image in accordance with the invention and the code size to be detected in the image.

DETAILED DESCRIPTION

A code reader comprises a CMOS image sensor, a source of light to illuminate a target (one or more of the codes affixed to an object, a license plate . . . ) through a scanning window; and an optical system which allows for reflecting back the light reflected by the target onto the sensor's matrix of pixels. The light source is generally based on LEDs, to illuminate the target for taking the image, by flash. Some systems can, moreover, integrate a laser source associated with a diffractive optical device, with the aim of assisting the operator to centre the target code prior to taking the image, by projecting a particular motif (cross, angles, . . . etc.), This operation is known under the Anglo-Saxon term "aimer". Said laser source is normally unlit, before the LED flash occurs in order to take the image. The taking of the image by the reader is triggered by an electronic or manual mechanism: the reader exits a standby mode (low consumption) and activates the light source and the sensor, in order to take the image and transmit it to an external code recognition system, external to the sensor.

The CMOS image sensor conventionally, as shown in FIG. 1, comprises a matrix 1 of pixels comprising N lines and M columns (N, M being integers). The pixel transistor control signals are generated by a control circuit 2 (recorded as "SEQ"), which is activated by the triggering signal, Trig, of the code recognition. Said pixel control signals serve to control the exposure time of the pixels, in a global manner ("snapshot"), or scrollably, line by line ("rolling shutter"), then the sequential reading, line by line. In particular, the SEQ circuit provides a horizontal synchronisation signal, Lsync, to the pixel line selection circuit 3, to clock the sequential reading of the lines of pixels, by way of the reading circuit. The reading circuit comprises a digital analogue conversion chain (CAN), generally associated with a stage of controlling gain (CAG), and the M numerical values read out for the current line of pixels selected. for reading are delivered at clock rate output. $Clk_{px}$, during the corresponding period of line activation (Lsync). Thus, as shown in FIG. 2, during each Lsync pulse corresponding to a selection of pixel line $L_i$ the read-out circuit successively outputs the corresponding M digital data, for example in ascending order of the columns. $DATA-L_i$ means the M data read out in the pixel line of rank i (i being an integer equal to 1 to N). The succession of the N $DATA-L_i$ forms the DATA flow of capture image data which is transmitted to the circuit 6 of interface I/O of the sensor, in order to form the corresponding DATA-OUT capture image frame provided to an external code recognition system (not shown).

A classic embodiment of the capture image frame is illustrated in FIG. 2. The FSync frame synchronisation signal has been represented, wherein "activation" marks the beginning of the reading phase of the N image lines, and which remains active until the end of said reading phase. To each period of Lsync activation, there is a corresponding $DATA-L_i$ data flow.

The image data frame transmitted to the external recognition system in practice includes a frame header and a footer, which frames the flow of data of the N image lines. In particular, the header contains information such as the quantity of image data (size of the image). Actually, a full image capture, or one based only on areas of interest, can be implemented. The values of the image capture parameters of the image that has just been taken are likewise generally recorded. In particular, it concerns the TINT duration of the exposure time, the encoding dynamics (number of greyscale codes) and the conversion gain. These values are provided by a register 5 of parameters of the sensor (FIG. 1), during a period of activation of a corresponding signal, F-h, prior to the activation of the frame synchronisation signal Fsync. These values are transmitted because they are useful for utilising the image and assessing the conditions when the image was taken. That in particular allows for the external system to order the image to be re-taken with different values, if the image received is not good, for example under-exposed or over-exposed. it is usual to transmit the data calculated in regard to the image to the footer of the page, for example the histograms calculated in regard to all or part of the image. Said histograms in particular make for assessing the correct exposure of an image.

The size (number of bits) of the frame header and the footer is small in relation to the frame size reserved for the actual image data. In one example, a number of bits is provided for the header or tooter of the page which corresponds to the number of bits of the data of an image line.

These general reminders being made, we are going to he able to describe the CMOS image sensor embodiment for a barcode reader proposed in the invention.

According to the invention, a CMOS image sensor integrates the means of calculation which allows for extracting the image data, the data which corresponds to information concerning the presence or location of the code(s) in the image, reliably. Said information is provided in a manner which complements the external recognition system in the footer of the image frame, in order to allow it to focus its computational and memory power on the capture image data in the image areas which it can identify, thanks to said complementary data.

The image sensor thus comprises digital processing means 7 (FIG. 1), which are configured to calculate a small image or a macro-image, which is an image, each point of which corresponds to a block of points of the capture image, and the value of each macro-image point is an indication of the presence/location of code in the corresponding portion of the capture image (the block of points).

Conventionally, the sensors generally comprise the digital processing means which the operators of elementary calculations use (adders, multipliers, dividers, comparators), which are, for example, used to calculate the histograms. The histogram calculations are useful to the sensor to allow it to adapt the exposure time of the pixels, set to a default value for a data application, when the histogram shows that the image is over or under-exposed. The sensor can also adapt the conversion gain in the reading stream to increase the contrast. The macro-image calculation in accordance with the invention uses the same elementary operators, so that space is saved and they are easy to integrate into the sensor chip, in order to calculate the value of each macro-image point, taking as a starting point the capture image data, at the point of the data being acquired, by way of a filter calculation that is representative of a spatial feature of the codes. Said circuit 7 comprises (FIG. 1) a line memory ML temporary, of limited depth (number of lines), adapted to the size of the filter masks. This line memory preserves the data of the lines of pixels read just prior to the current reading line. The usual sizes of the masks are 3×3 and 5×5. For a 3×3 mask, for example, two lines of memory are sufficient to make the filter calculations on each pixel on the fly. In any case, the line memory has a depth of at least a dozen lines, which can easily be integrated into the sensor chip. The digital processing circuit 7 also comprises the means Acc of accumulation/memorisation, in order to accumulate, according to their calculation, the macro-image points data. Once the matrix of pixels has been read, said means provide the macro-image data—macro-data—to the I/O interface circuit. In terms of practical implementation, said means, Acc, may include as many accumulation registers as macro-image points to be calculated. But it would also be possible to have as many registers as points in a macro-image line, associated with a macro-image memory, for storing the calculation done on the fly, the point values of each line of macro-image. Hereinafter, in order to simplify the matter, a register of accumulation can be alluded to (Acc).

The calculation process on the fly in accordance with the invention, for extracting a spatial digital signature, implemented in the digital circuit 7, is now going to be explained with the aid of the chronogram shown in FIG. 3, the organigram shown in FIG. 4, and the details of the stages of the calculation process illustrated in FIGS. 5 and 6. For this description, a calculation process 100 is selected, which utilises the size 3×3 mask(s) for filtering. The calculation process 100 uses two lines of memory denoted $M_{L1}$ and $M_{L2}$ of the memory of line $M_L$ (FIG. 1). As illustrated schematically in FIG. 5, by being placed, in the conventional case of a sequential reading of the N lines of pixel by the same reading circuit in the column footer (FIG. 1), commencing with the line of rank 1, $L_1$, up to the line of rank N, $L_N$, if the current reading phase (Lsync) is that of the line L, the memory of line $M_{L1}$ contains the reading data of line and the memory of line $M_{L2}$ contains the reading data of line $L_{i-2}$. In the subsequent reading phase (reading of line $L_{i+1}$), the data of line $L_i$ passes into the memory of line $M_{L1}$ which "pushes" the data of line $L_{i-1}$ which it contains, into the memory of line $L_{i-2}$.

Likewise, we could take, for example, a process which makes for extracting a high frequency signature of the capture image, with the aim of obtaining a corresponding macro-image which needs to allow for identifying the code regions which contain a high density of black and white alternations, or two very contrasting levels of grey, in at least one direction, while the rest of the image (in the relevant application context) contains little of it, in other words, one expects to be able to identify, in this macro-image, white "boxes", the size of which could correspond to some code.

For this extraction, a gradient calculation is applied, in at least one direction, and the information that is retained is the magnitude of the gradient (i.e. the absolute value of the gradient, without considering the sign). A gradient calculation is preferably applied in at least two directions, in such a way as to obtain the greatest value possible at each point, by adding up their respective magnitudes. Actually, the "capture" codes in the image are not necessarily aligned, in relation to the pixel matrix axes. This will often be the case in applications in which the code reader is stationary, and the items to be scanned arrive on a conveyor belt in front of the camera of the reader. Certain codes likewise have a high frequency signature in different directions, in particular the symbolic 2D codes and the alphanumeric strings. In order to enable the most reliable location possible, it is of interest to obtain high frequency information at each point that is supposed to be the most complete (the most extensive).

The calculation process 100 thus comprises a first stage 101 of filter calculation. At this stage 101 (FIG. 4), a first filter $Fcv_1$ is applied in the example, corresponding to a horizontal gradient $G_H$, using a respective convolution mask $[a]_1$ (FIG. 5); and a second filter $Fcv_2$, corresponding to a vertical gradient Gv, using a respective convolution mask $[a]_2$. The horizontal direction corresponds, in a conventional manner, to the direction of the lines of pixels, and the vertical direction to that of the columns of pixels. The two filter calculations are implemented in parallel, on the fly, for each capture image point, in accordance with the acquisition of the data of said point and the adjacent points, on the inside of the mask window, centred on the capture image point concerned (window $W_{i-1, j}$ for the image point corresponding to the pixel located on the line i–1 and the column j in the matrix of pixels, FIG. 5). Two corresponding recorded values, $V_{GH}$ and $V_{GV}$, are obtained, the absolute values of which are added (the gradient magnitude, without considering the sign), in order to obtain a value $V_F$ which is the result of the filter calculation implemented at the stage 101, and which here represents the amount of high frequency information at this point, without taking the direction into consideration.

In practice, the calculation is done on the fly in line with the provision of the pixel data by the reading circuit, line by line. For each pixel, the calculation result of each filter (a linear combination of the filter coefficients with the values of the image points in the adjacent window centred on the pixel) is obtained, once the process has been able to obtain the numerical values of the pixel, and of its adjacent pixels, defined by the mask window centred on the pixel concerned. It emerges from FIG. 5 that the values $V_{GH}$, $V_{GV}$ and $V_F$ for the pixel $PX_{i+1, j}$ are obtained, when the current reading line selected is the line L.

$V_{px}$, the numerical value of a capture image point, which is the value provided by the reading circuit 4, and which represents the amount of signal integrated by a corresponding signal into the matrix during the exposure time of the image taken, can be noted. Said value is encoded using r bits, in the example (FIG. 4), 12 bits. The values $V_{GH}$, $V_{GV}$ and $V_F$ are the values encoded using said same number of bits.

FIG. 4 shows what could be the corresponding images calculated, if all computed data were collected, for each one, in a respective image memory (which is purely hypothetical—only a simulation is concerned here) and that it is displayed, taking, by way of example, a capture image of a target object comprising a number of codes of the symbolic type, 1D and 2D, of different sizes.

The image $I_{HD}$, corresponding to all the data $V_{px}$, (collective DATA group formed by N DATA-$L_i$) can be seen. The corresponding images calculated, having a horizontal gradient ($I_{GH}$), vertical gradient ($I_{GV}$) and high frequency, non-directional information ($I_F$), at the stage 101 of the calculation process in accordance with the invention can be seen as well. All these images $I_{HD}$, $I_{GH}$, $I_{GV}$ and $I_F$ have N lines, M columns, and a depth of 12 bits.

The stage 102 following the calculation process corresponds to a binarisation of the high frequency image obtained, which makes for separating off the noise from the high frequency signal of the image. By improving the signal-to-noise ratio, the confidence index concerning the code location information which is provided at the output of the sensor is increased. In practice, the binarisation is performed as previously, on the fly, on each of the values $Y_F$ resulting from the filtration stage calculation process 101 (FIGS. 4 and 5). And it consists in comparing the value $Y_F$ at a binarisation threshold, Vs1. In practice, it can be anticipated that this value Vs1 is provided to the digital processing circuit 7 by a sensor parameter register (5), and that a default value is set, which generally corresponds to a mean grey level. The default threshold value (in the register) can be modified by a user or by the recognition system, for instance in accordance with the test image characteristics obtained in the application context (mean value of the grey levels calculated on the test images or actual images). It can also be provided for that the digital processing circuit adapts said threshold value in line with the calculation, based on the grey level values of the capture image data already processed. In this case, the threshold value used is not necessarily constant along the height of the image.

A binary value $V_B 1$ per capture image point is obtained. The corresponding image simulated $I_B 1$ comprises N lines and M columns, at a depth of 1 bit. At this stage, point information that is not code location information emerges. It is necessary to be able to rely on this information in order to form significant code location information, taking into account the size of the codes that may be present in the image.

This concerns the function of the subsequent stages, 103 and 104, by which the binary code location macro-image has just been formed in the capture image.

These stages are, like the others, implemented on the fly, in line with the receipt of the data needed to calculate the value of each macro-image point. Figuratively speaking, this concerns relaying the information between them, in order to try to form the "significant boxes", corresponding to the locations of code in the image, and, in a simple manner, by calculating on the fly, but reliably, meaning that the information output has an increased index of confidence.

For that, one proceeds in two stages, which are detailed in FIG. 6.

The first stage 103 corresponds to a tessellation, which is going to make it possible to match a macro-image point with each block B of points of the capture image, for which a recorded value $V\Sigma_q$ is calculated, taking as a starting point the binary values $V_{BIN} 1$ of the points of block B. In other words, making reference to the image simulation $I_{B1}$, the number of white points in the block in question is counted: the value $V\Sigma_q$ is quite indicative that the block B concerned could correspond to a code location in the image. This passage is implemented by an accumulation operation $\Sigma_q$ in a register element Acc corresponding to the block processed, meaning that the binary values $V_{BIN} 1$ of the points in block B concerned are added to their calculation on the fly (stages 101 and 102).

The tessellation operation corresponds to the capture image being divided by blocks of $n=2^{b1}$ lines and $m=2^{b2}$ columns. That defines the dimensions of the accumulation register element of the binary values of the n×m points of a block; this concerns a Q bits register, with Q=b1+b2.

Preferably, a tessellation consisting of squares, with b1=b2, adapted to all the codes and all the orientations, would be chosen. For example, if one takes b1=b2=6, one then has 4096 capture image points per block B and the accumulation register element Acc for each block allows for counting from 0 (all the points have a value of 0) to 4096 (all the points have a value of 1).

Advantageously, the value $V\Sigma_q$ provided within the output for each block may or may not be a truncated value. The index q is a parameter which indicates that, and it thus has a value which may be equal to 1, 2, 3, . . . , or Q bits. If q=4, for example, then the value $V\Sigma_q$, provided as output for each block, will be a value encoded using only 4 bits.

The corresponding macro-image $I\Sigma_q$ (FIG. 4) thus comprises n lines, m columns and a depth of q bits.

The greater the value of q, the richer will be the location information contained in the macro-image.

The choice of values n, m and q defines the dimensions of the macro-image size $I\Sigma_q$. Thus, depending upon the size of the block, smaller or larger, a value q can be chosen which can also be smaller (for a small block) or larger (for a larger block) so as to obtain a macro-image size (number of hits) that makes for calculating it on the fly at the time at which a capture image is acquired, as well as its integration into the footer of the frame. In other words, it is necessary to reach a balance between processing time, macro-image dimension and wealth of information.

The dimension of the block (number of lines and columns) firstly depends upon the number of lines and columns of the pixel matrix. Then, it must not be too small, in order to obtain the level of compression desired (calculating time, integration into the footer of the frame). However, it must also not be greater than the size of the codes in the image, as otherwise corresponding location information would be lost. We will return to these aspects further down below.

In a realistic example, for a pixel matrix of N=1920 lines and M=2560 columns, a block size of 64 lines×64 columns can be defined. A macro-image of n=30 lines and m=40 columns is obtained. If q=12 bits, the corresponding quantity of macro-image bits is 14,400 bits. If q=8 hits, it is 9600 bits, and if q=4, it is 4800 bits. The block size is adapted for the codes in the image of greater size, for example 100×100 pixels.

In one variant, we would like to provide a binary macro-image of $I_B 2$ (FIGS. 4 and 6). Preferably, an accumulation with truncation is then implemented at the stage 103, with the value of q being greater than 1, but less than Q. For example, q=4 bits is chosen, in order to then binarise the value obtained, in relation to a new threshold. The compression operation is of better quality. This is the stage 104 of binarisation BIN2 of the value $V\Sigma_q$, in relation to a threshold Vs2, which is illustrated in FIGS. 4 and 6. The threshold Vs2 can, as Vs1, be fixed at a value provided by the register 5 of parameters and defined depending upon the application context, or adjusted, taking as a starting point macro-images calculated based on either test images or actual images. It is also possible to envisage a mean grey level calculation per portion of macro-image I$\Sigma_q$, defining an adaptive threshold level Vs2. A new binary value Vn2 is obtained, for each corresponding binary macro-image point I$_B$2, which is a black and white image illustrated in FIG. 4, which shows the forms of white "boxes" which correspond to the location of the codes in the capture image I$_{HD}$.

It can be seen that the forms are not "perfect", with serrated edges or small projections.

In one embodiment shown in FIG. 7, a supplementary morphological calculation stage 105 is applied, comprising an erosion followed by an expansion, allowing for the significant content of the binary macro-image I$_B$2 to be improved. Said erosion followed by expansion operations are carried out on each macro-image point I$_B$2, based on the same set of adjacent pixels, where the vicinity is delimited by a structure known as a structuring element. The structuring element is adapted to the geometric criteria of the code or codes to be detected. For example, the structuring element, centred on the pixel, is cross-shaped, and the parameters concern, in particular, the width and the length of the branches (number of pixels). FIG. 7 shows improvements on the image: the forms of the white boxes are better defined; and some noise has been eliminated.

Ultimately, the calculation process implemented in the image sensor allows for obtaining a small image with significant content on the location of the codes in the capture image, which can be transmitted to the image transmission frame footer, following the capture image data. Said location data is directly usable by the external code recognition system, which can then focus its image processing algorithms on the capture image meats) identified in the macro-image as containing the high frequency information.

FIG. 8 serves to explain in what way the size of the block for the operation 103 is a performance criterion of the extraction process implemented in the invention. A capture image is shown which comprises three codes ID, one of which is smaller than the others, known as Code-1, and which is diagonally orientated in the example, unlike the other two codes, which are essentially orientated horizontally. It can be noted in passing that, in this example, if the two codes are aligned horizontally, the calculation of the vertical gradient will not bring to light any interesting information. The situation is different for the small code, "Code-1", as a result of its being diagonally orientated.

In addition, if a block B is used that is greater in size than the small code, for instance 64×64, it can be seen from the image I1 which corresponds to the small binary image output from the process 100 (after the stage 104 or after the stage 105) that the small code, Code-1, has not been located. The image 1 simulates a superimposition of the information of the small image I1 upon the capture image 10. With a smaller block B, in the example 32×32, it can be seen that the small code is well located (image I2 and I'2).

The calculation process 100 for calculating the macro-image implemented by the digital processing circuit 7 just described takes place synchronously with the reading (the acquisition) of the capture image data by the reading circuit 4, in order to process the data of the pixel lines one by one, sequentially. In other words, the digital processing circuit 7 is clocked (FIG. 1) like the pixel matrix, the reading circuit and the interface circuit I/O, by the Fsync frame synchronisation clock signals (new image), Lsync line synchronisation (new line) and pixel clock Clk$_{px}$, (following pixel).

At each new frame (Fsync), the digital processing circuit is re-initialised, in particular the line memory M$_L$ and the accumulation register Arc are re-set to zero. The stages 101 to 103, 101 to 104 or 101 to 105 of the process then take place, according to the availability of the values involved in each calculation, for each pixel, on a rolling basis, in x and y (FIG. 5), at the clock pulse of the pixel clock.

The corresponding image frame is illustrated in FIG. 3, which schematically shows how the small image is actually calculated in a synchronous manner and on an ongoing basis, to form the macro-data in the accumulator register A$_{CC}$. Said macro-data is integrated into the footer of the frame, following the image data DATA-L$_i$, transmitted in the body of the frame.

The calculation process that has just been described, for extracting a high frequency capture image signature, may be applied in the same way to extract the other spatial signatures (of repetition, direction, . . . etc.). For the same object, if a number of successive images taken are carried out, it is thus possible to calculate different spatial signatures, in regard to the entire image or part of it, which in turn allows for supplementing the location information by way of successive passes. In particular, it is possible to implement an image capture by zooming in (using a magnification lens belonging to the optical system of the code reader integrating the sensor) on a part of the scene which corresponds to an area of interest determined taking the small image as a starting point, extracted from the full image, and it is possible to obtain a more precise spatial signature, based on other geometric criteria. To take a numerical example: if the size of a code in a capture image taken for a given capture distance occupies 256×256 pixels, a corresponding "white" box will be obtained in the macro-image, which will not exceed 4×4 pixels, which, however, provides proper location information (position and size in the capture image). The recognition system may request that the image be taken a second time, zooming in on the corresponding area of interest, in order to obtain more precise spatial information, based on the spatial high frequency criteria, as described above, or on other geometric code criteria.

Each time, it remains a filter calculation (or multiple filter calculations, in parallel). What changes are the convolution masks used, in other words the coefficients of the filters, and possibly the size of the mask (5×5, for instance, instead of 3×3). A mask memory [a]$_k$ can therefore easily be provided for in the sensor and for a given image taken one or more convolution masks are selected in said memory. The different thresholds of the process, namely Vs1, Vs2 and the value q of truncation, can be configured, as can the dimensions of block B. The latter can be done in different ways, by way of a pointer value for a memory of corresponding parameters (a mask memory, for example), or by way of the actual value of the parameter. The specialist skilled in the art knows how to implement that in practice. The sensor thus comprises corresponding parameters in one or more parameter registers (Register 5, FIG. 1).

The invention claimed is:

1. A CMOS image sensor configured to implement the capturing of an image, upon external command (trig), and to output, towards an optical code recognition system, capture image data within a corresponding image frame (DATA-OUT), the image sensor being integrated into the same integrated circuit chip as a matrix of pixels comprising N lines and M columns and a sequential read circuit of the N lines of pixels of the matrix, wherein the sensor includes a digital processing circuit configured to apply a calculation process to the capture image data according to the acquisition of them by the sequential read circuit and in a synchronous manner, in order to calculate, on the fly, a macro-image, taking as a starting point the capture image data corresponding to the code location information in said capture image, and to transmit it to the footer of said image frame (DATA-OUT), following said capture image data, said macro-image being such that each macro-image point corresponds to a block (B) of points of the capture image, said calculation process of the macro-image comprising at least for each pixel of the matrix:

a first stage of calculation of at least one filter (Fcv) defined by the coefficients of a convolution mask, which establishes, for the pixel, a first numeric value ($V_F$), corresponding to high-frequency spatial information extracted from the capture image data of said pixel and the adjacent pixels in an adjacent window delimited by the convolution mask centered on the pixel, the calculation being carried out on the fly by the sequential read circuit of said capture image data of the respective pixel and the adjacent pixels as the acquisition progresses, said first numeric value being encoded using the same number of bits (r) as said capture image data;

a second stage of binarisation (BIN1) of the first numeric value, establishing a first binary value ($V_B1$) for each pixel of the matrix; and for each block (B) of pixels of the matrix:

a third stage of calculation of a second numeric value ($V\Sigma$) by adding up said first binary values ($V_B1$) of the pixels in the block concerned in an accumulation register of Q=b1+b2 output bits, where b1 and b2 define the number n=$2^{b1}$ of lines of pixels in the block and the number m=$2^{b2}$ of columns of pixels in the block, n and m being greater than 1.

2. The image sensor of claim 1, wherein the second numeric value is a value encoded using q bits ($V\Sigma_q$), where q=1 at Q.

3. The image sensor of claim 2, wherein the calculation process includes a fourth stage of binarisation (BIN2) of said second numeric value.

4. The image sensor of claim 1, wherein the calculation process includes a fourth stage of binarisation (BIN2) of said second numeric value.

5. The image sensor of claim 4, wherein the calculation process includes a fifth stage of morphological processing by erosion followed by expansion, which is applied to the binary values established by the fourth stage.

6. The image sensor of claim 5, comprising a memory of configurable convolution masks.

7. The image sensor of claim 1, comprising a memory of configurable convolution masks.

8. The image sensor of claim 7, wherein the first numeric value is the absolute value of the result of the convolution mask calculation.

9. The image sensor of claim 7, wherein said first stage of calculation applies, in parallel, to at least a first and a second convolution mask, corresponding, respectively, to a horizontal gradient calculation and a vertical gradient calculation in each pixel of the matrix, wherein the first numeric value ($V_F$) is the sum of the absolute values of said gradients calculated.

10. The image sensor of claim 7, wherein said first stage corresponds to a filter calculation from among at least one filter from the following list: a non-directional high-frequency filter calculation combining one or more gradient calculations in a fixed direction, a filter corresponding to the spatial characteristics representing a type of code.

11. The image sensor of claim 1, wherein the first numeric value is the absolute value of the result of the convolution mask calculation.

12. The image sensor of claim 1, wherein said first stage of calculation applies, in parallel, to at least a first and a second convolution mask, corresponding, respectively, to a horizontal gradient calculation and a vertical gradient calculation in each pixel of the matrix, wherein the first numeric value ($V_F$) is the sum of the absolute values of said gradients calculated.

13. The image sensor of claim 1, wherein said first stage corresponds to a filter calculation from among at least one filter from the following list: a non-directional high-frequency filter calculation combining one or more gradient calculations in a fixed direction, a filter corresponding to the spatial characteristics representing a type of code.

14. The image sensor of claim 13, wherein the sensor is configured to:

apply a first data filter calculation of a first capture image of a target object, and apply a second filter calculation, different from the first, to data of a second capture image from the same target object, said first and second filter calculations being selected from said list.

15. The image sensor of claim 14, wherein the second capture image corresponds to zooming in on an area of interest determined taking the macro-image calculated using the data of the first capture image as a starting point.

16. The image sensor of claim 15, wherein the block size of pixels is a function of the size of code(s) in the capture image.

17. The image sensor of claim 1, wherein the block size of pixels is a function of the size of code(s) in the capture image.

18. The image sensor of claim 17, wherein the block size is configurable.

19. The image sensor of claim 18, wherein the stages of binarisation make use of a respective threshold value (Vs1, Vs2), that is configurable.

20. The image sensor of claim 1, wherein the stages of binarisation make use of a respective threshold value (Vs1, Vs2), that is configurable.

* * * * *